Dec. 27, 1955     A. F. WOODELL     2,728,366
ROTARY CUTTER HEADS WITH RESILIENT BLADE HOLDING ARMS
Filed July 11, 1952

INVENTOR.
ALBERT F. WOODELL
BY
Alfred W Petchaft
ATTORNEY

ABOVE LINE: 2,728,366
Patented Dec. 27, 1955

United States Patent Office

2,728,366
ROTARY CUTTER HEADS WITH RESILIENT BLADE HOLDING ARMS
Albert F. Woodell, Dallas, Tex.

Application July 11, 1952, Serial No. 298,360

2 Claims. (Cl. 144—229)

This invention relates in general to certain new and useful improvements in circular woodworking cutters and, more particularly, to a molding head for use in conjunction with bench saws.

It is the primary object of the present invention to provide a molding head arranged for operative disposition upon the arbor or spindle of a bench saw or similar machine tool and being provided with a plurality of removable and interchangeable cutting blades located around its periphery.

It is another object of the present invention to provide a molding head of the type stated having uniquely constructed gripping means arranged at uniformly spaced intervals around its periphery for holding removable blades in a tight, secure, and precisely aligned manner.

It is also an object of the present invention to provide a molding head of the type stated in which the removable blades may be quickly and conveniently removed, changed, or replaced and are held in precise and balanced alignment so that the molding head will run evenly and will make a precise true cut.

With the above and other objects in view, my invention resides in the novel features of form, construction, arrangement, and combination of parts presently described and pointed out in the claims.

In the accompanying drawings—

Figure 1:
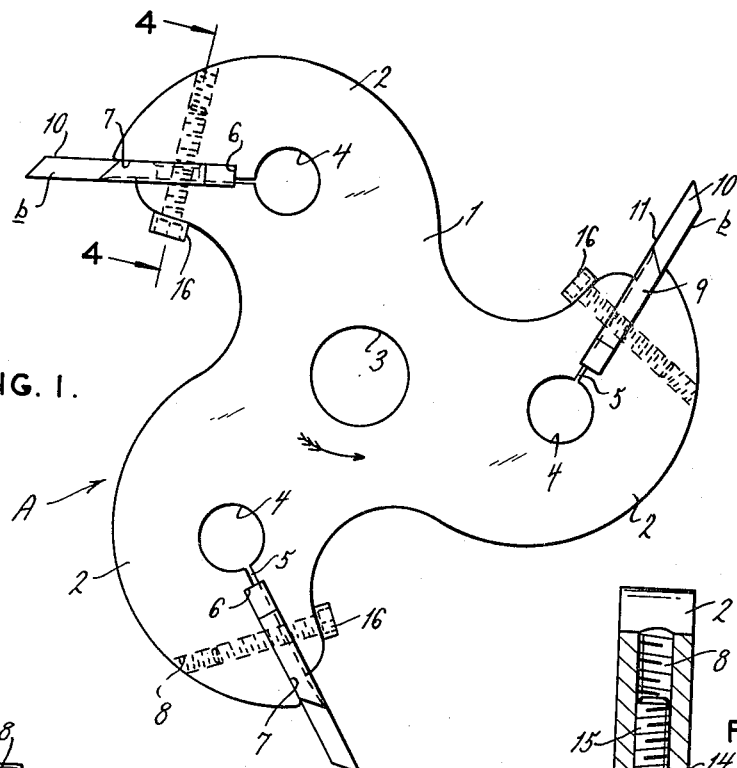
Figure 1 is a side elevational view of a molding head constructed in accordance with and embodying the present invention.
Figure 4:
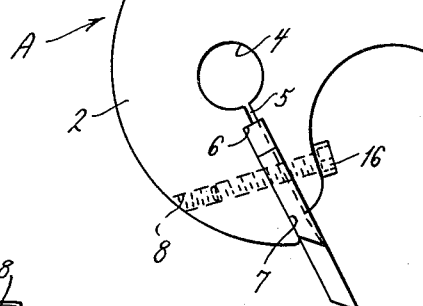
Figure 4 is a fragmentary sectional view taken along line 4—4 of Figure 1.

Referring now in more detail and by reference characters to the drawings, which illustrate a preferred embodiment of the present invention, A designates a molding head forged or otherwise suitably formed from heavy gauge steel and comprises a relatively thick plate 1 integrally provided around its periphery with three uniformly spaced radial arms 2 curved or hooked forwardly in the direction of rotation, as indicated by the arrow in Figure 1. The plate 1 is centrally provided with a precisely bored circular aperture or so-called arbor-hole 3.

Each of the arms 2 is similarly bored to provide a circular aperture 4 which opens laterally into a non-radial forwardly angulated slot 5 which is, in turn, widened at its outer end in the provision of transverse abutment shoulders 6 and a blade-retaining slot 7. Finally, each arm is drilled and tapped to provide an internally threaded bore-hole 8, the longitudinal axis of which lies midway between the lateral faces of the plate 1 and is disposed at acute angles both to the longitudinal axis of the blade-retaining slot 7 and to the radial line passing between the centers of the arbor-hole 3 and aperture 4, all as best seen in Figure 1. It will also be noted that the rearward side of each slot 7 is higher than the forward side for purposes presently more fully appearing.

Figure 5:
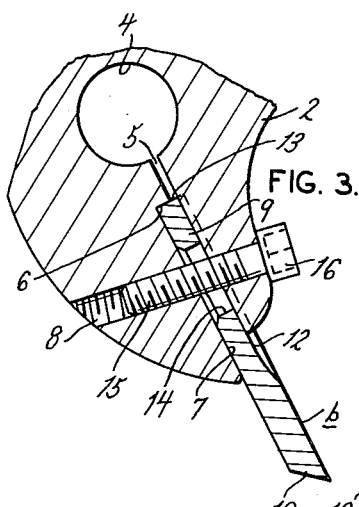
Figure 5 is a perspective view of one of the removable cutting-blades forming a part of the present invention.
Figure 5:
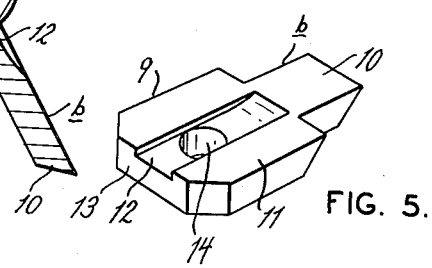

Provided for removable disposition within the cutter A are three identically shaped cutter blades b, each integrally consisting of a shank 9, which is substantially wider than the plate 1 and thicker than the blade-retaining slots 7. The shanks 9 of each of the blades b are integrally provided with outwardly extending identically shaped cutting teeth 10, which are sharpened to the same pattern. It should be understood in this connection that, although the blade b shown in Figure 5 is adapted for cutting a rectangular groove, various other edge-patterns or configurations can be employed to cut moldings of any desired shape or conformation. Upon its forward or cutting face 11 each blade is provided with a centrally disposed longitudinal groove 12, having a width precisely equal to the thickness of the plate 1 and a depth equal to the difference between the thickness of the blade 9 and the width of the blade-retaining slot 7, so that the blade will fit snugly and precisely within the blade-retaining slot 7 with its transverse or end-face 13 snugly against the shoulder 6. Each blade 9 is further provided with a centrally located transverse aperture 14 which opens into the slot or recess 12, all as best seen in Figure 5.

Figure 3:
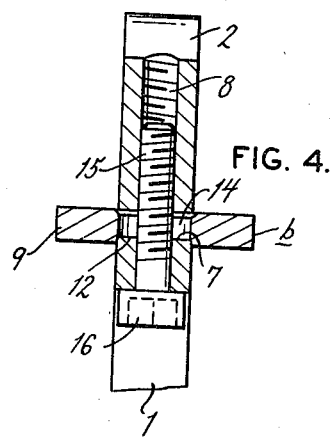
Figure 3 is a fragmentary sectional view taken along line 3—3 of Figure 2.

Also provided for removable disposition in the bore-hole 8 is a locking bolt 15 having an enlarged head 16 preferably provided in its end face with a hexagonal socket for receiving a conventional Allen-wrench (not shown). The aperture 14 in the blades 9 is substantially larger in diametral size than the bolt 15, so as to freely clear the bolt when in operative position, as best seen in Figure 3.

Figure 2:
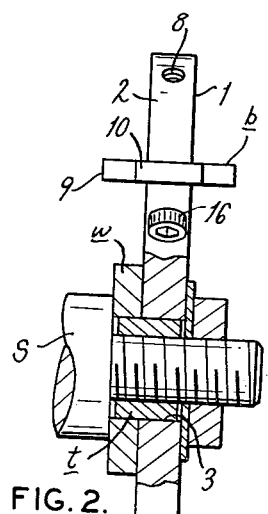
Figure 2 is a front elevational view, partly broken away and in section, of the molding head as mounted upon a bench saw arbor.

Since the cutter A may be used in conjunction with various different types of bench saws, it is conventional practice to employ various different sizes of tubular bushings t and spacing washers w, which are utilized in mounting the cutter A upon a saw arbor S, as illustrated in Figure 2. It will be understood in this connection that the arbor-hole 3 is sized to fit the largest standard arbor size usually employed by manufacturers of bench saws and bushings t may be supplied to fit various smaller arbor sizes. Similarly, the spacing washer w may be employed to position the cutter O outwardly of the arbor S, if the particular machine on which the cutter A is being mounted is equipped with a dado insert, the center line of which is located in such a manner as to require the cutter A to be positioned outwardly along the arbor S.

When the cutter A is being set up for use, the blade-retaining bolts 15 are completely removed and a set of three selected cutter blades b are inserted in the slots 7 with their end-faces 13 tightly against the shoulder 6. The bolts 15 are then reinserted and tightly secured, squeezing the side faces of the slot 7 toward each other so as to hold the blades 9 in a vise-like grip. It will be noted that the bolts 15 pass loosely through the apertures 14 and, thus, the blades b will be held in place even though accidentally the bolts 15 may be loose due to carelessness of the operator or other causes. Since the side faces of the recess 12 are snugly engaged against the lateral faces of the arms 2 adjacent the slot 7, the blades are held in true radial alignment and will not tend to wobble from side-to-side. Furthermore, the manner in which the blades are held will cause each blade to track precisely behind the other so as to form a clean precise cut.

It should be understood that changes and modifications in the form, construction, arrangement, and combination of the several parts of the molding head may

Having thus described my invention, what I claim and desire to secure by Letters Patent is:

1. A rotatable molding cutter adapted for use with bench saws and the like, said cutter comprising a plate having a central arbor-hole and a plurality of equally spaced radially projecting arms each of which is provided with a non-radial slot inclined outwardly and forwardly in the direction of rotation of the cutter and opening upon the peripheral margin of the arm, thus dividing said arm into two blade engaging jaws, said slot terminating at its inner end in a flat transverse bottom wall, said jaws being provided with a transverse bore extending therethrough and intersecting said slot, each of said arms further being provided with an aperture located inwardly from the transverse end wall and connected to the slot by a narrow slit which is parallel to the longitudinal axis of the slot and substantially smaller in width than the slot, cutter blades each having forward and rearward faces and being adapted for removable disposition within each of said slots, said blades each being substantially thicker than the circumferential width of the slots, said blades each being provided upon its forward face with a longitudinal recess having a depth substantially equal to the difference between the thickness of the blade and the circumferential width of the slot, said recess, furthermore, having a transverse width substantially equal to the thickness of the plate for snugly fitting around and embracing the margins of the slot, said blades each further having a relatively large aperture, and means extending through each blade aperture and through said bore for drawing the jaws clampwise together thereby tightly gripping and retaining the blades, said means being substantially smaller in diametral size than the blade apertures so that the blade is held in place by clamping pressure but nevertheless, in case the blade becomes loose due to improper clamping, it will be prevented by said means from flying out of the slot.

2. A rotatable molding cutter adapted for use with bench saws and the like, said cutter comprising a plate having a central arbor-hole and a plurality of equally spaced radially projecting arms each of which is provided with a non-radial slot inclined outwardly and forwardly in the direction of rotation of the cutter and opening upon the peripheral margin of the arm, thus dividing said arm into two blade engaging jaws, said slot terminating at its inner end in a flat transverse bottom wall, said jaws being provided with a transverse bore extending therethrough and intersecting said slot, each of said arms further being provided with an aperture located inwardly from the transverse end wall and connected to the slot by a narrow slit which is parallel to the longitudinal axis of the slot and substantially smaller in width than the slot, cutter blades each having forward and rearward faces and being adapted for removable disposition within each of said slots, said blades each being substantially thicker than the circumferential width of the slots, said blades each being provided upon its forward face with a longitudinal recess having a depth substantially equal to the difference between the thickness of the blade and the circumferential width of the slot, said recess, furthermore, having a transverse width substantially equal to the thickness of the plate for snugly fitting around and embracing the margins of the slot, said blades each further having a relatively large aperture, and a bolt extending through each blade aperture and through said bore with its longitudinal axis disposed at an acute angle to the longitudinal axis of the slot for drawing the jaws clampwise together thereby tightly gripping and retaining the blades, said bolt being substantially smaller in diametral size than the blade apertures so that the blade is held in place by clamping pressure but nevertheless, in case the blade becomes loose due to improper clamping, it will be prevented by said bolt from flying out of the slot.

References Cited in the file of this patent

UNITED STATES PATENTS

| 345,662 | Blaney | July 20, 1886 |
| 1,032,636 | Watkins | July 16, 1912 |
| 1,440,931 | Oliver | Jan. 2, 1923 |
| 2,561,470 | Hadley et al. | July 24, 1951 |

FOREIGN PATENTS

| 24,424 | Finland | Dec. 15, 1950 |